Patented Nov. 18, 1952

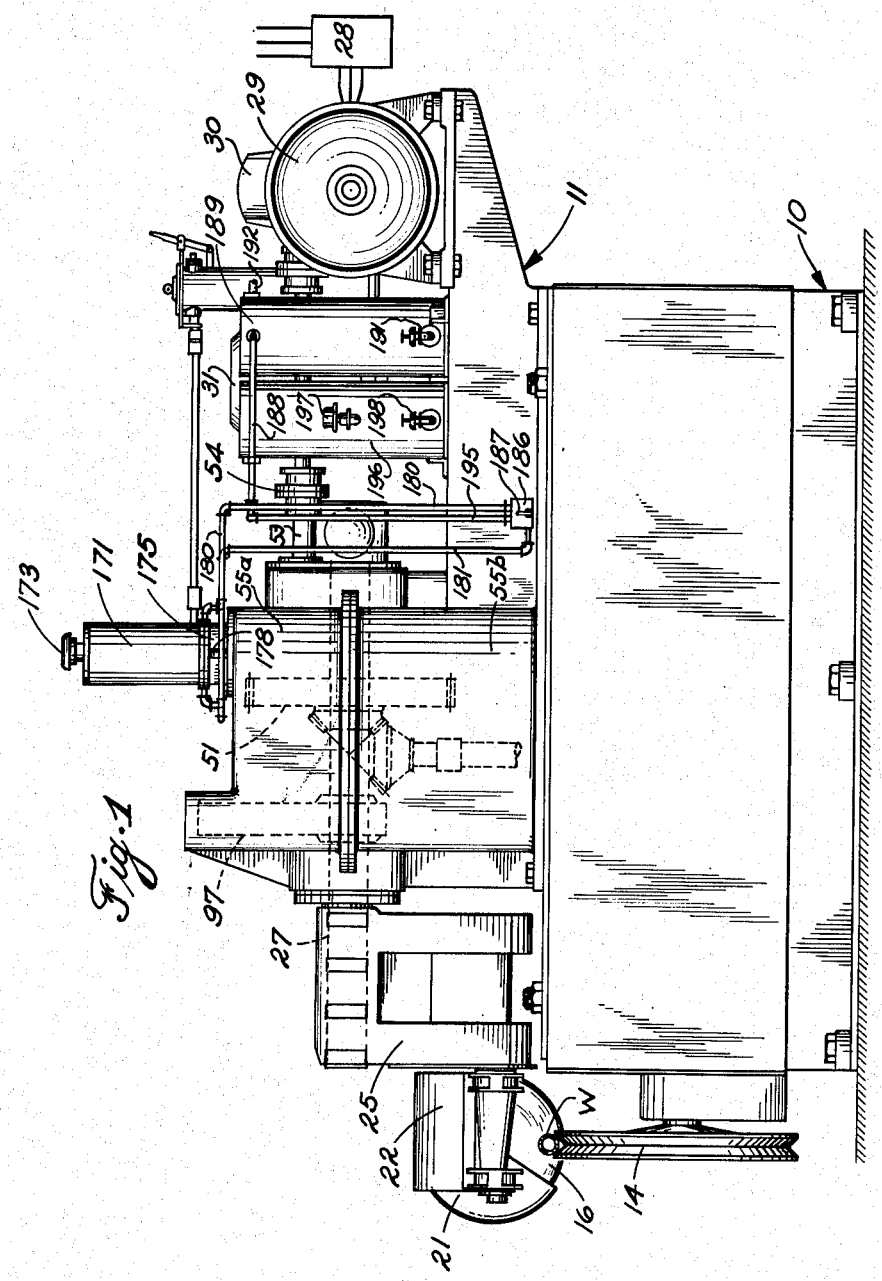

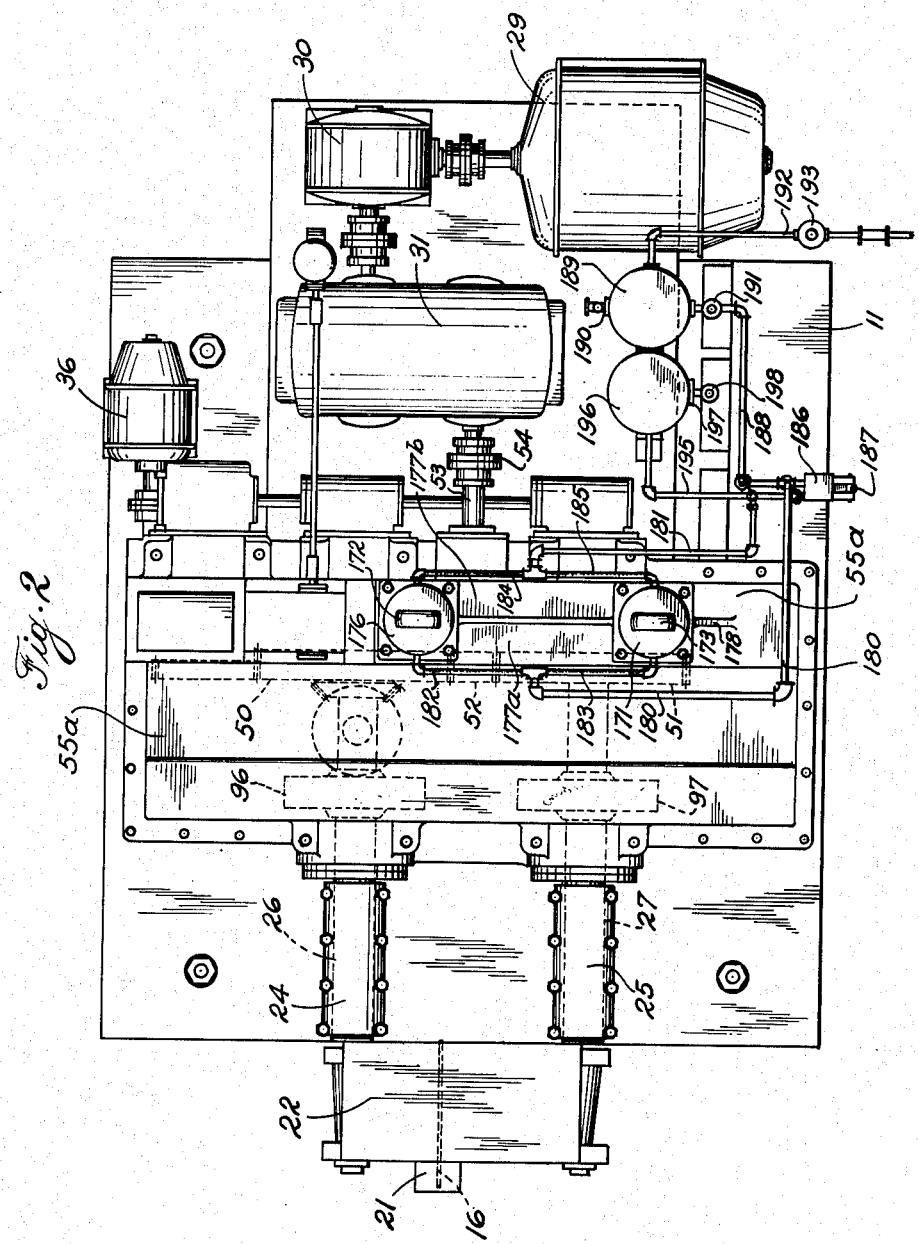

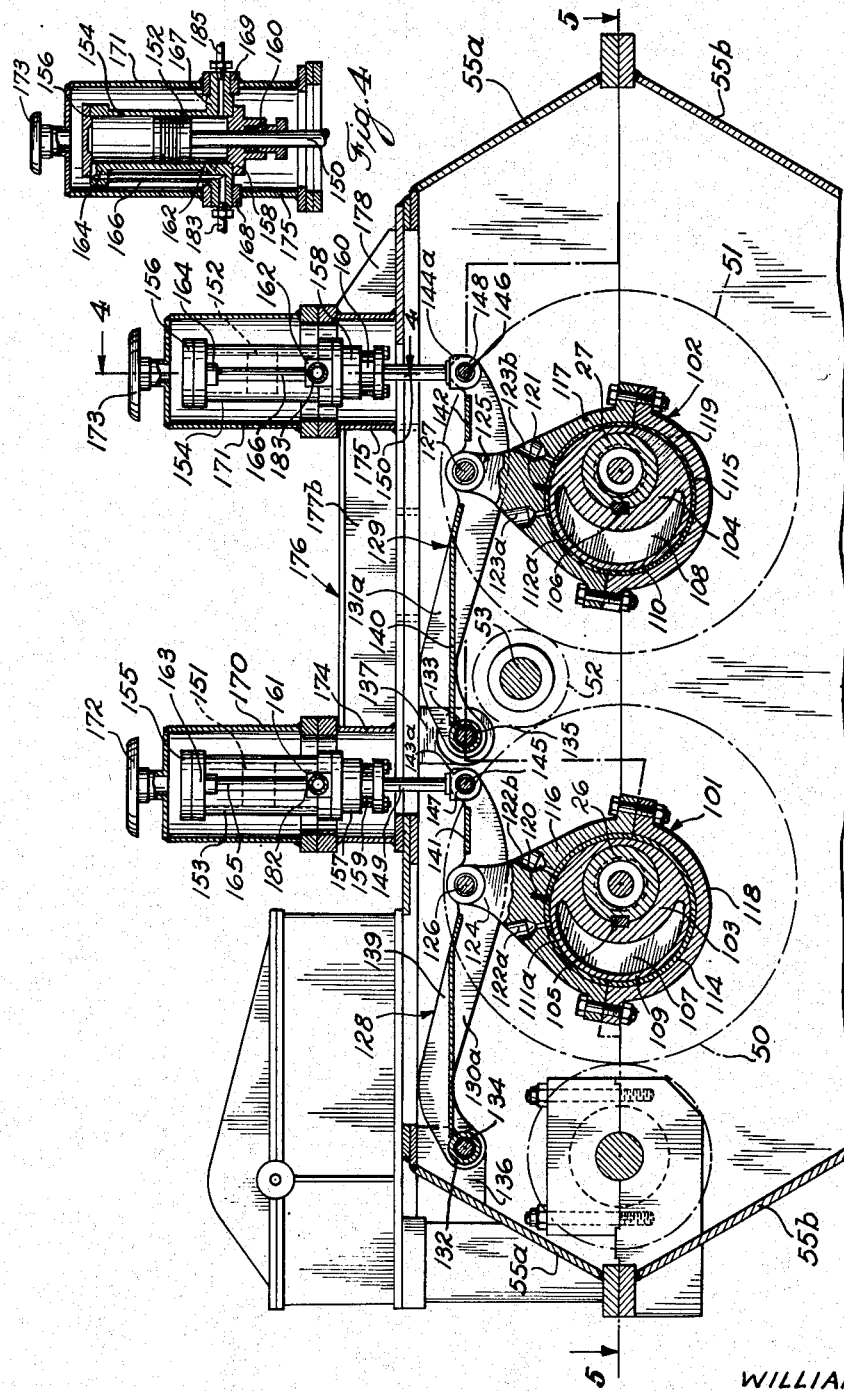

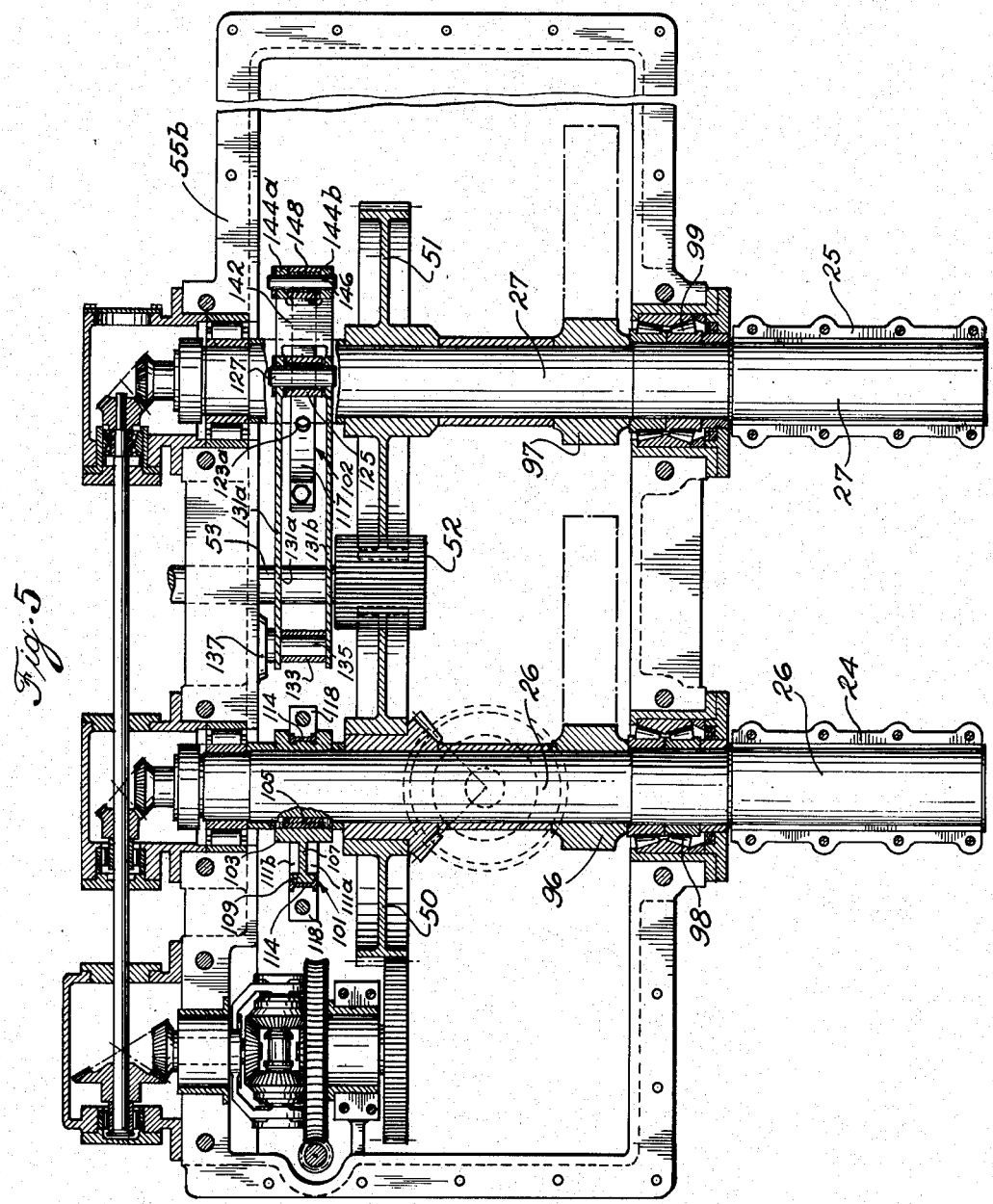

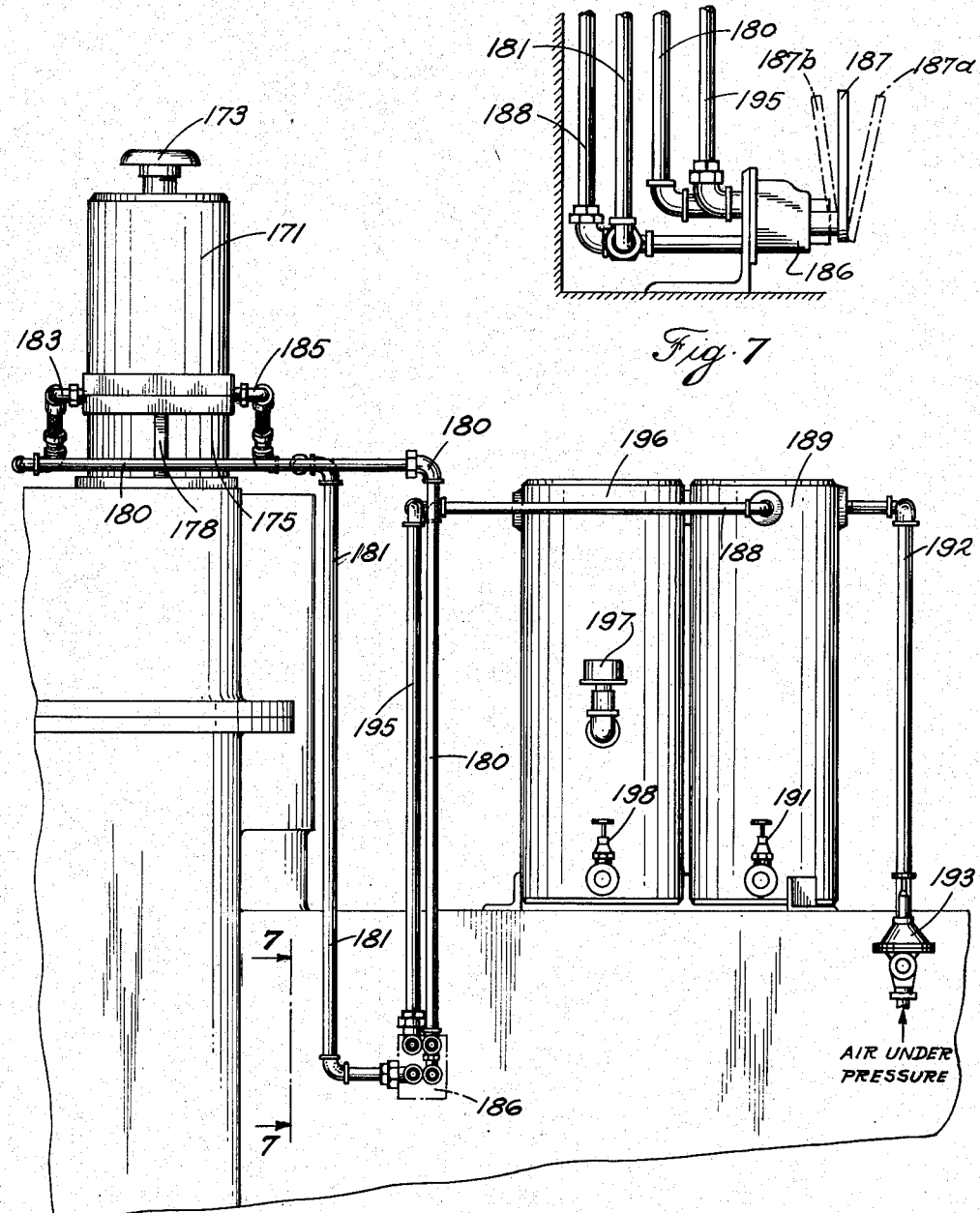

2,618,045

UNITED STATES PATENT OFFICE 2,618,045

PNEUMATIC COUNTERBALANCE FOR FLYING HOT SAWS

William Rodder, Youngstown, Ohio, assignor to The Aetna-Standard Engineering Company, Youngstown, Ohio, a corporation of Ohio Application November 29, 1949, Serial No. 130,055

18 Claims. (Cl. 29—69)

This invention relates to a balancing system for a metal-working machine incorporating a cutting tool moving in an orbital path, as, for example, a flying hot saw of the kind shown, described and claimed in prior application Serial No. 69,521, filed January 6, 1949, in the name of William Rodder.

In the apparatus therein disclosed, two cooperating crank assemblies carry a circular saw around an orbital path. Such crank assemblies are characterized by adjustable crank arms the lengths of which may be increased or decreased without disassembling any part of the apparatus; i. e., while the apparatus as a whole remains in operating condition. On the other hand, the power trains by which the crank assemblies are driven include two or more counterweights of fixed size, shape and location. For predetermined settings of the crank arms, usually about midway of their lengths, the moments of the counterweights approximately equal the moments of the crank assemblies, but for all other settings there will of necessity be some degree of unbalance in the system. In general, the greater the degree of adjustment; i. e., the greater the departure from the setting at which the moments of the counterweights equal the moments of the crank assemblies, the greater the degree of unbalance.

It is an object of the present invention to improve upon this state of affairs by incorporating in the apparatus a flexible balancing system that will complement the counterweights in the event that unbalance is developed, as, for example, by adjustment of the lengths of the crank arms. Such balancing system can take any of various forms. It may employ a pressure fluid which may be either a gas or a liquid, but preferably the former. In a preferred embodiment of the invention, the balancing system includes one or more fluid-pressure motors which assist in overcoming the unbalance. The use in the apparatus of such a balancing system achieves a principal object of the invention; to wit, automatic compensation for unbalance without necessitating the making of extensive external or internal adjustments, as, for example, by replacing or relocating counterweights.

Other objects and advantages of the invention will be apparent from the accompanying drawings, in which Figure 1 is a side elevation of a flying hot saw embodying the balancing system of the present invention; Figure 2 is a corresponding plan; Figure 3 is a vertical section, with parts in elevation, taken immediately to the rear of the drive gears in the flying hot saw of Figures 1 and 2; Figure 4 is a detail of the nature of a section taken on line 4—4 of Figure 3; Figure 5 is a section taken in part on line 5—5 of Figure 3 and in part on a plane passing through the axes of hollow shafts 26 and 27, for convenience of illustration; Figure 6 is an enlarged elevation, somewhat simplified, of the balancing system incorporated in the flying hot saw of Figures 1 and 2; and Figure 7 is a detail of the nature of an elevation of part of the piping system as seen from line 7—7 of Figure 6. For convenience, the flying hot saw shown in the drawings as embodying the invention is in the main, but not in all details, the flying hot saw shown in the drawings of the above-identified prior application.

As illustrated in Figures 1 and 2 of the drawings, the flying hot saw in which the invention is shown as incorporated comprises a base section, indicated in general at 10, that is supported on the mill floor, and a top section, indicated in general at 11, mounted upon the base section. The two sections are adjustably mounted with respect to each other in a manner permitting top section 11 to be moved up or down on base section 10. The top section carries a circular saw, together with mechanism for moving the saw in an orbital path. The base section is provided with suitable guides for the work W, which may take the form of pipe. It carries a work-deflecting cam, together with the mechanism for operating it. The cam 14 is pear-shaped, notched, and mounted for rotation on a shaft carried by an eccentric. By proper timing of the eccentric, cam 14 is caused to deflect the work periodically into the path of circular saw 16.

Saw 16 is driven by an electric motor, being mounted directly on the motor shaft, and is partially enclosed within a guard 21. The motor, saw and guard are supported by a suitable frame member 22. The saw assembly so made up is carried in a circular orbit by two substantially identical adjustable cranks 24 and 25, which cranks mount the assembly in such manner that the axis of the motor and saw extends parallel and the plane of the saw blade extends perpendicularly to the path of work W. The cranks 24 and 25 are supported on the projecting end portions of hollow shafts 26 and 27, shown in Figure 5, such shafts being driven through intervening power trains from a main drive motor 29 mounted on top section 11 at the rear of the apparatus as a whole. Motor 29 operates at a speed proportional to the speed of the mill delivering work W to the apparatus, conventional electrical controls indicated diagrammatically at 28 being provided for this purpose.

Hollow shafts 26 and 27 are rotated in synchronism with each other and in the same direction, usually counterclockwise as seen from the front of the apparatus as a whole, by means of gears 50 and 51. The gears are themselves driven by a pinion 52 carried by main drive shaft 53. The latter is driven by main drive motor 29 through a speed reducer 30, a P. I. V. (positive infinitely variable) drive 31, and coupling 54 (Figures 1, 2 and 5). The relationship between the rotational speed of main drive motor 29 and the speed of the work W passing through the apparatus is fixed and maintained by means of the controls 28 for motor 29. By this arrangement, it becomes possible to adjust the rotational speed of the saw assembly, and therefore the length of the sections into which work W is being cut, by adjusting P. I. V. drive 31. Adjustment of P. I. V. drive 31 is effected by means of the adjusting motor 36 appearing in Figure 2 to the rear of upper member 55a of two-part gear housing 55a, 55b.

In order to maintain the lineal speed of the saw assembly at the time the cutting action takes place as close as possible to the lineal speed of work W, it is necessary to change the radius of the cranks whenever the length of the sections being cut is changed. As has been indicated, the latter is done by increasing or decreasing the rotational speed of the saw assembly. When the rotational speed of the saw assembly is increased, the length of the cranks must be decreased sufficiently to maintain substantially constant the lineal speed of the saw assembly in its orbit. The reverse action is required when the rotational speed of the saw assembly is decreased. These adjustments in the length of the cranks may be effected by means of adjusting motor 36 through mechanism appearing toward the upper left-hand corner of Figure 5 but more fully disclosed in the prior application, to which reference may be had for detailed information as to the precise mode of adjustment.

Whenever the length of the cranks is to be increased or decreased, the position of top section 11 with respect to base section 10 must be appropriately adjusted in order to maintain the lower edge of circular saw 16 in proper relation to the path of work W. To this end, top section 11 is supported on base section 10 by screw jacks (not shown) disposed at the four corners of base section 10. These screw jacks can be adjusted by adjusting motor 36 with or without change in rotational speed or change of length of cranks 24 and 25. Thus with the cranks set for an intermediate radius of, for example, 22½ inches, top section 11 of the machine, and, correspondingly, the center line of the cranks, can be raised or lowered by adjusting motor 36 in order that the lowermost point in the travel of the saw may be at substantially the same level at all times. By these adjustments, the speed of rotation of the saw assembly, the position of top section 11 relative to base section 10, and the length of cranks 24 and 25 can be changed simultaneously.

Inasmuch as the saw assembly and cranks 24 and 25 are necessarily massive, it is desirable to counterbalance these parts. To this end, counterweights 96 and 97 are secured to hollow shafts 26 and 27, preferably as close as possible to bearings 98 and 99. The counterweights may be simple steel castings of appropriate size, weight and location; however, the largest portions of the counterweights necessarily project oppositely to cranks 24 and 25. Figures 1, 2 and 5 illustrate schematically the outlines of such counterweights. The hub portions of the counterweights appear in section in Figure 5, the parts indicated in dotted lines being disposed above the section.

Such counterweights cannot be readily changed; consequently, when cranks 24 and 25 are lengthened to something more or shortened to something less than an assumed neutral medial radius of 22½ inches, a condition of unbalance results. If, for example, the cranks are lengthened to a typical maximum of 27 inches, having been counterbalanced for a length of 22½ inches, unbalance results due to the fact that the moments of the cranks and associated mechanism exceed the moments of the counterweights and, in effect, the counterweights become too light. Similarly, if the cranks are shortened to a typical minimum of 18 inches, having been counterbalanced for a length of 22½ inches, unbalance results due to the fact that the moments of the counterweights exceed the moments of the cranks and, in effect, the counterweights become too heavy. In typical situations such unbalance may result in nonuniform rotational speed of the assembly and vibration of the apparatus with reduction in the accuracy of the lengths cut by the saw.

To compensate for unbalance so introduced, the balancing system of the present invention is arranged to apply forces to rotating parts of the apparatus which can be controlled by the operator in accordance with what is required to act either in the same direction as or in the opposite direction to the action of the force of gravity on the cranks and associated mechanism. In general, as will appear, a preferred form of such balancing system is made up of two like crank means in the form of eccentrics, two rocker arms, and two fluid-pressure motors. The latter overlie the ends of the rocker arms. The rocker arms overlies the eccentrics. The eccentrics are mounted on hollow shafts 26 and 27 in the space immediately to the rear of gears 50, 51 and pinion 52. Thus the introduction of the balancing system into the apparatus requires no important rearrangement of parts but mainly the addition of certain elements hereinafter described.

As indicated in Figure 3, the balancing system of the present invention includes the two eccentrics 101 and 102, respectively mounted on hollow shafts 26 and 27, which eccentrics are of similar construction and, in general, similarly related to the apparatus as a whole. Eccentrics 101 and 102 embody sleeve portions 103 and 104 fixed by keys 105 and 106 to hollow shafts 26 and 27, respectively. Midway of each such sleeve, a web projects radially, such webs being designated 107 and 108. The webs terminate in circular collars 109 and 110, respectively, such collars being eccentric to the axes of hollow shafts 26 and 27. Collars 109 and 110 are short in length compared to bushings 103 and 104 but each is characterized by the presence on its outer face of a flange which cooperates with the remainder of the structure in the manner hereinafter described. One such flange, the same forming part of collar 109, appears in section in Figure 5 of the drawings. Because of the presence of the webs, eccentrics 101 and 102 have crescent-shaped recesses on opposite sides thereof, recesses 111a and 111b shown in Figure 5 flanking web 107 and two like recesses (of which only one, 112a, appears in the drawings) flanking web 108.

Surrounding collars 109 and 110 and fitting snugly around the above-described flanges forming part of the collars are bronze bearings 114 and 115, both of which appear in Figure 3 and one of which, 114, appears in transverse cross-section in Figure 5. Bearings 114 and 115, which are characterized by H-shaped sections, receive the flanges on collars 109 and 110 on one side thereof and on the other are surrounded by eccentric straps which are generally circular in shape and are made up of connectors 116 and 117 and clamps 118 and 119 fixed to the connectors by bolts or the like. Pins 120 and 121 locate bearings 114 and 115 relative to connectors 116 and 117, thus precluding rotation of such bearings within the connectors. Collars 109 and 110 rotate in the bearings in response to rotation of hollow shafts 26 and 27. As shown in Figure 3, at the two sides of pins 120 and 121 are lubrication openings 122a, 122b and 123a, 123b, one of which, opening 123a, appears in plan in Figure 5.

Connectors 116 and 117 are provided with necks 124 and 125 within which are circular openings in which are received connector pins 126 and 127, respectively. The latter are supported in and by the two rocker arms designated 128 and 129, the former of which cooperates with eccentric 101 and the latter of which cooperates with eccentric 102. Rocker arms 128 and 129 are of welded construction, being built up of sheet or plate material. Rocker arm 128 includes far side piece 130a while rocker arm 129 includes far side piece 131a, both of which side pieces appear in elevation in Figure 3. In each case, a near side piece parallels the side piece shown in Figure 3, such near or second side piece in the case of rocker arm 129 being shown in section in Figure 5, wherein it is designated 131b. At their left-hand ends, the side pieces making up rocker arms 128 and 129 are separated by spacers 132 and 133, respectively, such spacers taking the form of bronze-lined sleeves that are rigidly affixed at their opposite ends to the two side pieces.

Pin 134 at the left-hand end of rocker arm 128 is carried by supports of the nature of ears attached to upper housing member 55a, one of which, 136, appears in elevation in Figure 3. A similar support 137, likewise taking the form of an ear, is represented as carrying pin 135 at the left-hand end of rocker arm 129. Rocker arms 128 and 129 pivot about pins 134 and 135, respectively. Extending generally lengthwise of rocker arms 128 and 129, respectively, are the relatively long reinforcing plates 139 and 140 and the relatively short reinforcing plates 141 and 142, all of which appear in section in Figure 3. Reinforcing plate 142 also appears in elevation in Figure 5. Reinforcing plates 139 and 141 on one hand and 140 and 142 on the other are separated by a space sufficient to accommodate necks 124 and 125 of eccentrics 101 and 102.

At their right-hand ends, rocker arms 128 and 129 are provided with yokes formed of opposed yoke arms, one on each side piece. Far yoke arm 143a at the right-hand end of rocker arm 128 and far yoke arm 144a at the right-hand end of rocker arm 129 both appear in Figure 3, while both far yoke arm 144a and near yoke arm 144b appear in section in Figure 5. Extending in each case from one to the other of the two opposed yoke arms and projecting through openings therein are wrist pins 145 and 146, the former at the free end of rocker arm 128 and the latter at the free end of rocker arm 129. Wrist pins 145 and 146 are respectively surrounded by and carried in bronze-lined bearing sleeves 147 and 148 at the lower ends of piston rods 149 and 150. Thus angular movement of rocker arms 128 and 129 in response to rotary movement of eccentrics 101 and 102 is communicated to piston rods 149 and 150, wherein it manifests itself as linear movement; similarly, linear movement of piston rods 149 and 150 imposes angular movement on rocker arms 128 and 129 and rotary movement on eccentrics 101 and 102.

The eccentrics, which are, of course, equivalent to cranks are secured to shafts 26 and 27 in such positions that their equivalent cranks project from the shafts 26 and 27 in the same directions as the cranks 24 and 25; i. e., in the position shown in Figure 5, the cranks 24 and 25, which are not visible in this figure, extend horizontally to the left of shafts 26 and 27 and the equivalent cranks of eccentrics 101 and 102 extend in the same direction. Thus forces exerted downwardly on the eccentrics act in the same direction as gravity acts on the cranks 24 and 25 and associated assembly, while forces acting upwardly on the eccentrics act in the same direction as gravity on the counterweights 96 and 97. Thus if the cranks are shortened beyond their assumed middle length of 22½ inches, they will be in effect too light and the counterweights too heavy; this unbalance can be compensated by exerting downward forces on the eccentrics through piston rods 149 and 150, whereas unbalance caused by an increase in length of the cranks beyond their assumed middle length can be compensated for by applying upward forces on the eccentrics through the piston rods.

In order to make possible the application of forces of the proper magnitude and direction substantially to balance the rotating cranks and counterweights in all positions of adjustments, I preferably employ fluid pressure motors in the form of pneumatic cylinders and pistons. To this end piston rod 149 carries at its upper end a piston 151; similarly, piston rod 150 carries at its upper end a piston 152. The pistons move respectively within cylinders 153 and 154, which are similar in construction and which respectively include top cylinder heads 155 and 156, bottom cylinder heads 157 and 158, and packing glands 159 and 160. As shown in Figures 3 and 4, cylinders 153 and 154 have at their bases and on their near sides as seen in Figure 3 integrally formed bosses 161 and 162 through suitable openings in which pressure fluid can be admitted or exhausted. Overlying bosses 161 and 162 are two like bosses 163 and 164, the same being located near the tops of cylinders 153 and 154 and on the near side of the cylinders as seen in Figure 3. Like bosses 161 and 162, bosses 163 and 164 have openings drilled therein to permit pressure fluid to pass therethrough. By means of connecting pipes 165 and 166, such pressure fluid may pass therebetween as indicated in Figure 4, being admitted to or exhausted from the space above the piston. On the far side of cylinders 153 and 154 as seen in Figure 3 and at the base of the cylinders are similarly formed bosses, one of which, 167, appears in section in Figure 4.

Like the bosses previously described, the bosses on the far side of cylinders 153 and 154 are drilled to permit pressure fluid to be admitted or exhausted therethrough, the openings therein communicating with the spaces below the respective cylinders.

Surrounding the bosses at the lower ends of the cylinders are suitable mounting sleeves, two of which, 168 and 169, appear in section in Figure 4. Such sleeves, which are drilled and tapped to receive lines carrying pressure fluid to and from the cylinders, are for the purpose of locating the bosses in proper position within the cylinder housings. The latter, designated 170 and 171, surround cylinders 153 and 154, respectively, as shown in Figure 3. They are surmounted by double outlet vents 172 and 173. Cylinder housings 170 and 171 are respectively supported on cylindrical foundation pieces 174 and 175 which are connected by a triangular superstructure 176 made up of two like halves 177a and 177b. A triangular end flange, designated 178, is mounted after the fashion of a buttress as indicated in Figures 2 and 3, thus lending additional strength and rigidity to foundation pieces 174 and 175 and superstructure 176.

By means of the piping system shown in Figures 1, 2, 6 and 7, the pressure fluid, ordinarily air, is admitted to and exhausted from the spaces in cylinders 153 and 154 above and below pistons 151 and 152. A conduit 180, which branches as shown in Figure 2 into two lines 182 and 183, supplies air to or withdraws air from the space above the pistons, communicating therewith in the manner indicated in Figure 4. A conduit 181, which branches into two lines 184 and 185, supplies air to or withdraws air from the spaces below the pistons, communication with the spaces below the pistons being as indicated in Figure 4 through the bosses at the rear of the cylinders. Conduits 180 and 181 are seperately connected at their lower ends to a hand-controlled four-way valve 186 equipped with and operated by a handle 187.

By moving handle 187 from one to the other of the two extreme positions 187a and 187b indicated in Figure 7, it is possible to reverse the direction of flow of air to and from cylinders 153 and 154. With handle 187 in position 187a, air under pressure is admitted through conduit 189 and lines 182 and 183 to the spaces above the pistons and discharged by means of lines 184 and 185 and conduit 181 from the spaces below the pistons, thereby tending to force the pistons downward. If, however, handle 187 is moved to position in 187b, air under pressure is admitted through conduit 181 and lines 184 and 185 to the spaces below pistons 151 and 152 and the air in the spaces above the pistons is exhausted through lines 182 and 183 and conduit 180, thereby tending to force the pistons upward. Thus air under superatmospheric pressures ranging upward to perhaps 100 pounds per square inch but in a typical case at a pressure of perhaps 45 pounds per square inch can be admitted simultaneously above the two pistons to bias them downward or below the two pistons to bias them upward while the opposite ends are at substantially atmospheric pressure.

Control valve 186 communicates by means of a conduit 188 (see Figure 2) with a pressure tank 189 provided on the far side thereof with a relief valve 190 and on the near side with a drain valve 191. Tank 189 is supplied with air at a constant pressure by means of a line 192 in which is incorporated an adjustable pressure regulating valve 193. Air being exhausted from the cylinders passes from valve 186 through a conduit 195 into an exhaust tank 196. As indicated in Figure 6, tank 196 is provided with a breather device 197 and a drain valve 198; air conveyed to tank 196 through conduit 195 is exhausted to the atmosphere through breather device 197. With this arrangement the force exerted by the piston for any given setting of the valve 193 is substantially constant at all times. Tanks 189 and 196 are mounted as shown in Figures 1, 2 and 6 toward the rear of top section 11 just forward of main drive motor 29.

In the operation of the balancing system, if crank arms 24 and 25 carrying the saw assembly are being shortened to something less than their assumed middle length of 22½ inches, valve 186 is moved manually into position 187a. In consequence, air under pressure is supplied to the spaces above the pistons, air for that purpose passing from pressure tank 189 through conduit 188 to control valve 186 and thence through conduit 180 and lines 182 and 183 to cylinders 153 and 154. At the same time, air from the spaces below the pistons is exhausted through lines 185 and 186 and conduit 181. Because the crank arms are to be relatively short, the unbalance that will tend to result from the change in their length will be attributable to the greater moments of the counterweights; in effect, the counterweights will be too heavy and the crank assemblies too light; accordingly, it is necessary to brake the counterweights as they move down and the cranks move up. To that end, pistons 151 and 152 are urged downwardly by the pressure above them to urge the rocker arms downwardly, thus, in effect, adding to the weight of the crank assemblies.

On the other hand, if the crank arms are extended beyond their assumed middle length of 22½ inches, the unbalance will be attributable to the crank assemblies being in effect too heavy for the counterweights. Since the counterweights and crank assemblies are off-set from each other by 180°, air under pressure must be introduced into the spaces below the pistons by means of conduit 181 and lines 184 and 185 and exhausted from the spaces above the pistons by lines 182 and 183 and conduit 180. By moving control valve 187 into position 187b, the net effect will be to apply forces acting with the force of gravity on the counterweights; i. e., to urge the rocker arms upwardly and, in effect, increasing the weight of the counterweights.

In either case, the accuracy of the balancing can be checked by an ammeter which measures the power supplied to the main drive motor 29. Variations in the reading of the ammeter during each revolution of the cranks 24 and 25 and associated assembly indicate that the balancing is imperfect and that adjustment should be made by means of pressure regulating valve 193 in the pressure of the air above or below the pistons, as the case may be. With proper adjustment, the rotating parts are effectively balanced and variations in the angular velocity of the cranks and of the saw assembly in its orbit due to unbalance are substantially prevented. Thus the accuracy of the lengths of pipe cut by the saw is improved.

From what has already been said, it is apparent that the balancing system of the invention need not necessarily take the precise form shown and described but may be varied in a great many respects, including the use in lieu of cylinders 153 and 154 of various equivalents; e. g., other forms of fluid-pressure motors. The kind, arrangement and location of the fluid-pressure motors is optional in the sense that such might, if desired, be differently constructed, arranged and located in the apparatus, including positioning them below the level of hollow shafts 26 and 27 rather than above them in the manner indicated in Figures 3 and 4. Numerous other changes may be made without departing from the spirit of the invention.

It is intended that the patent shall cover, by summarization in the appended claims, whatever features of patentable novelty reside in the invention.

What is claimed is:

1. A metal-working machine comprising a cutting tool; means for moving the tool in an orbital path, said means including a crank; a crank shaft on which said crank is mounted; a counterweight on said crankshaft; a power train; a motor driving the power train; and, located between the motor and the means for moving the tool, a pneumatic system acting to apply complementary balancing forces to said crank shaft, said pneumatic system including a fluid pressure motor.

2. A metal-working machine comprising a cutting tool; means for moving the tool in an orbital path, said means including a crank; a crank shaft on which said crank is mounted; a counterweight on said crankshaft; a power train; a motor driving the power train; and means acting to apply complementary balancing forces to said crank shaft, said means comprising a fluid pressure motor and a rocker arm coupled to said crankshaft to which the fluid pressure motor is linked.

3. A metal-working machine comprising a cutting tool; means for moving the tool in an orbital path, said means including a crank; a crank shaft on which said crank is mounted; a counterweight on said crankshaft; a power train; a motor driving the power train; and means acting to apply complementary balancing forces to said crank shaft, said means comprising a fluid pressure motor, a pivotally mounted lever arm to which the fluid pressure motor is linked, and an eccentric coupled to the lever arm but turning with said crankshaft.

4. A metal-working machine comprising a cutting tool; means for moving the tool in an orbital path, said means including a crank; a crankshaft on which said crank is mounted; a counterweight for the crank, said counterweight being coupled to said crankshaft; and a balancing system including a fluid pressure motor for applying complementary balancing forces to said crank shaft.

5. A metal-working machine as in claim 4 in which the fluid pressure motor is biased to oppose rotation of said crankshaft throughout substantially 180° of each revolution thereof and to assist rotation of said crank shaft throughout the remaining 180° of each revolution thereof.

6. A metal-working machine as in claim 4 in which the fluid pressure motor is coupled to an eccentric mounted on the crank shaft.

7. A metal-working machine as in claim 4 in which the fluid pressure motor is coupled by a pivotally mounted lever arm to an eccentric mounted on the crankshaft.

8. A metal-working machine comprising a cutting tool; a crank for moving the tool in an orbital path, said crank being adjustable as to length; power means for operating the crank; balancing means acting on the power means; and complementary balancing means imposing on the power means selectively variable compensatory forces negativing the effects of unbalance resulting from a change in the length of the crank, said complementary balancing means being adapted to absorb power during a portion of each revolution of the crank and to supply power during another portion of each revolution thereof.

9. A metal-working machine as in claim 8 in which the complementary balancing means includes a fluid pressure motor comprising a cooperating cylinder and piston and means for supplying fluid under pressure thereto.

10. A flying hot saw comprising a prime mover; a power train driven by the prime mover; a counterweight incorporated in the power train; a fluid pressure system compensating for unbalance in the power train; a crank driven by the power train; a circular saw moved in an orbital path by the crank; and, cooperating with the saw, means for moving the work into the path of the saw.

11. A flying hot saw comprising a prime mover; a power train driven by the prime mover; a counterweight incorporated in the power train; a fluid pressure system compensating for unbalance in the power train; a crank driven by the power train, said crank being adjustable as to length; a circular saw moved in an orbital path by the crank; and, cooperating with the saw, means for moving the work into the path of the saw.

12. A flying hot saw comprising a prime mover; a power train driven by the prime mover; a counterweight incorporated in the power train; a fluid pressure system compensating for unbalance in the power train; a crank driven by the power train, said crank being adjustable as to length; a circular saw moved in an orbital path by the crank; and, cooperating with the saw, a cam for periodically deflecting the work into the path of the saw.

13. A metal-working machine comprising a cutting tool; a crank for moving the tool in an orbital path, said crank being adjustable as to length; power means for operating the crank; a counterweight for the crank, said counterweight being incorporated in the power means; and, imposing a compensatory load negativing the effects of unbalance resulting from a change in the length of the crank, a fluid pressure system acting on the power means.

14. A metal-working machine comprising a cutting tool; a crank for moving the tool in an orbital path, said crank being adjustable as to length; a crank shaft; a counterweight for the crank mounted on said crank shaft; a prime mover for operating the crankshaft; and, imposing a compensatory load negativing the effects of unbalance resulting from a change in the length of the crank, a separate power system acting on the crank shaft, said system being adapted to absorb power from said crank shaft during a portion of each revolution thereof and to supply power to said crank shaft during another portion of each revolution thereof.

15. A metal working machine according to claim 14 wherein the power system comprises a fluid pressure cylinder, a cooperating piston and means connecting them to the crank shaft.

16. A metal working machine according to claim 15 wherein valve means are provided to supply fluid under pressure to either side of said piston whereby the direction of the force exerted by said piston can be reversed.

17. A metal working machine according to claim 16 wherein fluid under pressure is supplied to said piston and cylinder from a pressure reservoir provided with pressure regulating means for controlling the pressure in said reservoir.

18. A flying hot saw for severing successive longitudinal sections from work such as pipe, tube, rod and the like, comprising a circular saw, a rotary support for carrying said saw in a circular orbital path, a shaft for driving said support, means for varying the radius of said rotary support, a fixed counterbalance on said shaft adapted substantially to balance said rotary support and saw in one position of adjustment of said rotary support and means for compensating for unbalance of said rotary support and saw resulting from adjustments in the radius of said rotary support, said compensating means comprising a cylinder, a piston therein, means connecting said piston to said shaft, and means for supplying fluid under greater pressure to one side of said piston than to the other side of said piston, whereby said piston acts to impose forces on said shaft tending to assist rotation thereof throughout substantially 180° of each revolution thereof and to oppose rotation thereof throughout the remaining 180° of each revolution thereof.

WILLIAM RODDER.

REFERENCES CITED

The following references are of record in the file of this patent:

UNITED STATES PATENTS

| Number | Name | Date |
| --- | --- | --- |
| 636,606 | Winton | Nov. 7, 1899 |
| 1,681,306 | Moon | Aug. 21, 1928 |
| 1,738,876 | Edwards et al. | Dec. 10, 1929 |
| 1,817,996 | Maltby | Aug. 11, 1931 |
| 1,923,261 | Gerting | Aug. 22, 1933 |
| 2,138,862 | Johnston | Dec. 6, 1938 |
| 2,190,638 | Talbot | Feb. 13, 1940 |
| 2,287,833 | Ridgway | June 30, 1942 |
| 2,350,975 | Rodder et al. | June 6, 1944 |
| 2,473,559 | Anderson | June 21, 1949 |